May 26, 1931.  L. RAYMOND  1,807,072

READY MADE CUSP

Filed May 22, 1929

INVENTOR
Louis Raymond,
BY
ATTORNEYS

Patented May 26, 1931

1,807,072

UNITED STATES PATENT OFFICE

LOUIS RAYMOND, OF NEW YORK, N. Y., ASSIGNOR TO BAKER & CO. INC., A CORPORATION OF NEW JERSEY

READY-MADE CUSP

Application filed May 22, 1929. Serial No. 365,933.

This invention relates in general to so-called ready-made gold cusps for crown and bridge work. These cusps usually comprise pieces of gold which have been shaped to conform to the occlusal surface of a natural tooth, and are combined with an artificial tooth facing and a backing of gold solder or the like.

In applying such cusps to artificial tooth facings, it is customary to place the cusp and the tooth facing in the desired relation to each other within a mold or cast composed of a special plastic material called "investment material", which when hardened serves to hold the cusp and the tooth facing in the proper relation while gold solder or the like is melted and flowed into the cusp and in back of the tooth facing. The gold solder serves to securely attach the facing to the cusp, and also as a backing or reinforcement for the cusp. During this operation it has been found that as the solder hardens and contracts, it pulls the cusps out of the mold or cast into an abnormal and improper relation to the tooth facing.

Among the objects of my invention are to provide a novel and improved method of making artificial teeth including sheet metal cusps, facings and backings of solder, and to provide a ready-made cusp of the general character described embodying novel and improved features of construction whereby the cusp may be securely held in the investment material or mold and reenforced against distortion during the application of the backing solder.

Other objects are to provide such a cusp having a projection or protuberance thereon which may be imbedded in the investment material in such a manner as to prevent the cusp from being accidentally pulled out of the material; to provide a ready-made cusp of this character wherein the projection or protuberance can be easily removed and in no way impairs the finished artificial tooth; to provide a cusp of this character which can be easily and economically manufactured, and to obtain other advantages and results as will be more fully brought out by the following description.

Figure 1:
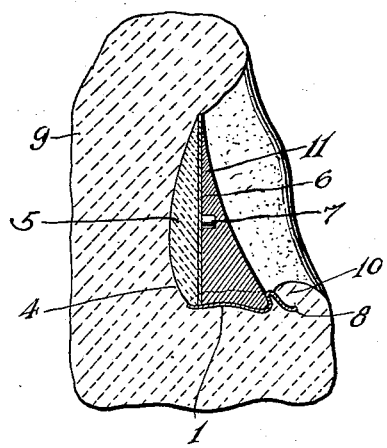
Figure 2:
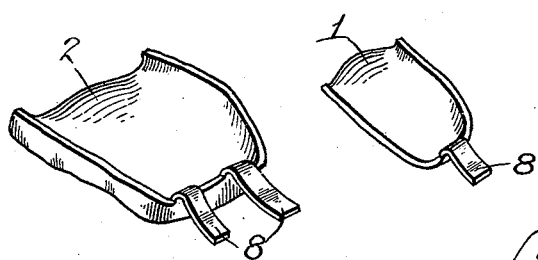

Referring to the accompanying drawings, in which corresponding and like parts are designated throughout the several views by the same reference characters, Figure 1 is a transverse vertical sectional view through an artificial tooth including a cusp embodying my invention, showing the tooth arranged in a block or mold of plaster or investment material, and Figure 2 is a composite perspective view of two cusps of different sizes embodying my invention.

Specifically describing the illustrated embodiment of the invention the reference characters 1 and 2 designate two ready-made cusps of different sizes, each of which comprises a sheet of gold or other suitable metal which is shaped to substantially conform to the occlusal surface of a natural tooth. The front side 3 of each of the cusps is adapted to accurately contact with the occlusal edge 4 of an artificial tooth facing 5 of known construction which includes the usual metal backing plate 6 and facing pins 7 projecting from the rear of the facing. The opposite side of the cusp is shown as provided with one or more integral projections, protuberances, tongues or lugs 8 which may be formed during the shaping of the cusps.

In making an artificial tooth including a cusp embodying my invention, the facing 5 and cusp 1 or 2 are arranged in the proper relation within a mold or block of plaster or investment material 9 which is initially plastic and is capable of hardening. The investment material is caused to overlie the tongues or lugs 8 by bending the lugs downwardly into the material as indicated at 10 so that said lugs are in effect imbedded in the material. Molten solder 11 is then flowed into the mold into contact with the backing plate 6 and the cusp 1 to firmly secure the cusp to the facing and to provide a reinforcement for the cusp. During this operation the lugs 8 securely hold the cusp against movement in the investment or mold, and resist the tendency of the hardening and contracting solder to draw the cusp out of the investment into improper relation to the facing 5. Also, the lugs reenforce the edges of the cusps to prevent distortion or deformation thereof during the soldering operation. After the tooth has been completed the mold is broken away from the tooth which is thereby removed from the mold; and thereafter the protuberances 8 may be burnished off so as to leave a smooth outer surface on the cusp.

It will be understood that while the embodiment of my invention above described is the now preferred one, the detail construction of the cusps may be modified or changed by those skilled in the art without departing from the spirit or scope of my invention which is defined by the appended claims when construed in the light of the prior art.

Having thus described my invention, what I claim is:

1. As an article of manufacture an artificial tooth cusp comprising a sheet of metal shaped to simulate the occlusal surface of a tooth and having a projection on the lingual side thereof to be imbedded in a plaster mold during the soldering operation in making an artificial tooth to hold said cusp against movement in the plaster and reenforce the edge of the cusp against distortion.

2. As an article of manufacture, an artificial tooth cusp comprising a sheet of metal shaped to simulate the occlusal surface of a tooth and having an integral lug projecting from the lingual edge thereof to be imbedded in a plaster investment to hold the cusp against movement therein and reenforce the edge of the cusp against distortion during the soldering of said cusp to a tooth facing in the making of an artificial tooth.

LOUIS RAYMOND.